(12) United States Patent (10) Patent No.: US 8,509,093 B2
Russell et al. (45) Date of Patent: Aug. 13, 2013

(54) OUTAGE ANALYSIS SYSTEM

(75) Inventors: Jim N Russell, Tulsa, OK (US); Kenny M Hawkins, Tulsa, OK (US); Bob E Taylor, Tulsa, OK (US); Paul P Hulm, Tulsa, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 219 days.

(21) Appl. No.: 12/055,410

(22) Filed: Mar. 26, 2008

(65) Prior Publication Data

US 2009/0245094 A1 Oct. 1, 2009

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC .......................................................... 370/242

(58) Field of Classification Search
USPC ................ 370/216, 217, 218, 219, 220, 221, 370/222, 223, 224, 225, 226, 227, 228, 241, 370/242
See application file for complete search history.

(56) References Cited

U.S. PATENT DOCUMENTS

| | | | | |
|---|---|---|---|---|
| 6,199,422 | B1 * | 3/2001 | Boerhout et al. | 73/1.82 |
| 6,377,543 | B1 * | 4/2002 | Grover et al. | 370/227 |
| 7,061,871 | B2 * | 6/2006 | Sheldon et al. | 370/242 |
| 2003/0083069 | A1 * | 5/2003 | Vadgama | 455/436 |
| 2006/0122985 | A1 * | 6/2006 | Yamamoto et al. | 707/3 |
| 2007/0116009 | A1 * | 5/2007 | Kangru et al. | 370/395.21 |
| 2007/0185849 | A1 * | 8/2007 | Vinnakota et al. | 707/3 |
| 2007/0211768 | A1 * | 9/2007 | Cornwall et al. | 370/509 |
| 2007/0220141 | A1 * | 9/2007 | Primm et al. | 709/224 |
| 2008/0056141 | A1 * | 3/2008 | Sheinfeld et al. | 370/244 |
| 2008/0091822 | A1 * | 4/2008 | Sheinfeld et al. | 709/224 |
| 2008/0250138 | A1 * | 10/2008 | Harnois et al. | 709/224 |
| 2008/0276135 | A1 * | 11/2008 | Granath | 714/57 |
| 2009/0141640 | A1 * | 6/2009 | Polland et al. | 370/242 |

* cited by examiner

*Primary Examiner* — Huy D Vu
*Assistant Examiner* — Adnan Baig

(57) ABSTRACT

A device may receiving alarms identifying failures of network elements, create a site table that includes a list of sites at which the alarms are generated and a number of alarms for each of the sites, determine whether an outage has occurred based on the alarms, analyze whether the outage is a false outage based on a failure of a probe that generates the alarms, and provide a notification that includes the site table, an indication of whether the outage has occurred, or an indication whether the outage is a false outage.

18 Claims, 16 Drawing Sheets

| DATE 104 | TIME 106 | SEVERITY 108 | PROBE 110 | LINK/NODE 112 | FAILURE TYPE 114 | |
|---|---|---|---|---|---|---|
| 1/02/2008 | 15:27:06 | CRITICAL | GEOPROBE_SNMT | FET~TP2-N12 | NODE ISOLATED | 102-1 |
| 1/02/2008 | 15L27:05 | MAJOR | GEOPROBE_SNMT | FET~TP2~N12-MCI~TP1 | LINKSET UNAVAILABLE | 102-2 |
| 1/02/2008 | 15:26:10 | CRITICAL | WORNJETSSG | 000006 | LINKSET UNAVAILABLE | 102-3 |
| • • • • | | | | | | |
| 1/02/2008 | 15:26:10 | CRITICAL | WORNJETSSG | 000032 | NODE ISOLATED | 102-M |

100

| DATE 104 | TIME 106 | SEVERITY 108 | PROBE 110 | LINK/NODE 112 | FAILURE TYPE 114 |
|---|---|---|---|---|---|
| 1/02/2008 | 15:27:06 | CRITICAL | GEOPROBE_SNMT | FET~TP2-N12 | NODE ISOLATED |
| 1/02/2008 | 15L27:05 | MAJOR | GEOPROBE_SNMT | FET~TP2~N12-MCI~TP1 | LINKSET UNAVAILABLE |
| 1/02/2008 | 15:26:10 | CRITICAL | WORNJETSSG | 000006 | LINKSET UNAVAILABLE |
| ... | | | | | |
| 1/02/2008 | 15:26:10 | CRITICAL | WORNJETSSG | 000032 | NODE ISOLATED |

Fig. 1

| SITE ID 604 | EQUIPMENT SPECIFICATION 606 | | | |
|---|---|---|---|---|
| AST | SSG-5070A | AA | DS1 | 213:1 | — 602-1
| AST | DNX-88 | AA | DS1 | 105:1 | — 602-2
| MEJ | DXC-1/0 | AB | DS1 | 1328 | — 602-3
| MEJ | DXC-1/0 | AB | DS1 | 390 | — 602-4
| WYV | M13 | ZAV | DS1 | 11 | — 602-5
| WYV | DXC-1/0 | AB | DS1 | 201 | — 602-6
| WYV | DXC-1/0 | AB | DS1 | 582 | — 602-7
| NOR | DXC-1/0 | AB | DS1 | 331 | — 602-N

| SITE 704 | COUNT 706 | |
|---|---|---|
| AST | 318 | — 702-1 |
| NOR | 88 | — 702-2 |
| MEJ | 67 | — 702-3 |
| ... | ... | |
| WYV | 67 | — 702-P |

| SITE 712 | DS1 714 | COUNT 716 | |
|---|---|---|---|
| NOR | DXC-1/0  AA  DS1  773 | 9 | — 710-1 |
| AST | DXN-88  AA  DS1  105 | 6 | — 710-2 |
| ... | ... | ... | |
| WYV | DXC-1/0  AB  DS1  582 | 6 | — 710-Q |

| SITE 722 | DS3 724 | COUNT 726 | |
|---|---|---|---|
| WYV | M13    ZAV | 12 | — 720-1 |
| PYM | M13    ZIH | 6 | — 720-2 |
| ... | ... | ... | |
| AST | DNX-88 AA | 6 | — 720-R |

718

| SITE | COUNT |
|------|-------|
| HAY  | 5     |
| DNJ  | 3     |

| SITE | DS3 | | COUNT |
|------|-----|-----|-------|
| HAY  | DNX-88 | AA | 5 |
| DNJ  | M13 | ZHE | 1 |
| DNJ  | M13 | ZCR | 1 |
| DNJ  | M13 | ZGD | 1 |

OUTAGE ANALYSIS SYSTEM

BACKGROUND

When a network element that carries network traffic and/or signals malfunctions, a network monitoring system may alert a network operator about the network element. Depending on the malfunction, the network operator may either wait until the network element recovers, or may dispatch an engineer to repair or replace the network element.

BRIEF DESCRIPTION OF THE DRAWINGS

FIG. 1 is a block diagram of exemplary alarm records;

FIG. 6 is a diagram of an exemplary circuit layout record;

FIGS. 7A through 7C are exemplary tables that summarize alarm records based on the exemplary circuit layout record of FIG. 6;

FIGS. 14A and 14B show exemplary tables that summarize alarms that are generated when devices in a network of FIG. 13 fail due to a network outage.

DETAILED DESCRIPTION OF PREFERRED EMBODIMENTS

Figure 2:
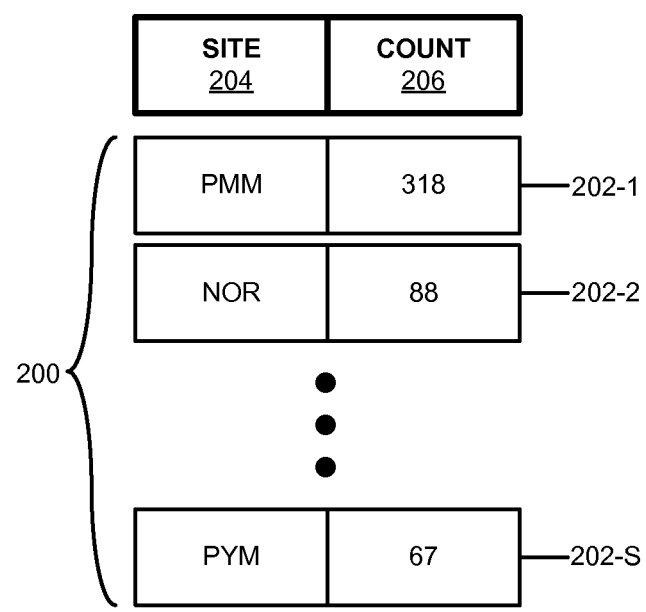
FIG. 2 is a block diagram of an exemplary site table for the exemplary alarm records of FIG. 1.

The following detailed description refers to the accompanying drawings. The same reference numbers in different drawings may identify the same or similar elements. The terms "message" or "packet," as used herein, may refer to one or more packets, datagrams, cells; fragments of one or more packets, datagrams or cells; or other types of data.

In the description to follow, an outage analysis system may receive alarms about network device failures/outages, summarize and/or analyze the alarms, and provide a report of the summary and/or analysis to a network operator, manager, and/or user. FIG. 1 is a block diagram of alarm records 100 that can be generated when a network outage occurs. As shown, alarm records 100 may include records 102-1 through 102-M (herein collectively referred to as records 102 and individually as record 102-x). As further shown, each record 102-x may include date and time fields 104 and 106 to indicate the day and time of the occurrence of a failure; a severity field 108 to indicate severity of the failure; a probe field 110 to identify the probe that has detected the failure; a link/node field 112 to identify the network element that has failed; and a failure type field 114 to identify the type of failure that is associated with the alarm record. In a different implementation, record 102-x may include fewer, additional, or different fields than those illustrated in FIG. 1.

In a large system, when an outage occurs, many network devices and/or links (e.g., tens of thousands) may fail, and flood the outage analysis system with alarms that are translated to alarm records 100 by the outage analysis system. Because the number of alarm records is large, attempting to diagnose a network problem by manually examining alarm records 100 may be difficult or impractical. In such an instance, a summary of information about the alarms may be helpful to the network operator, manager, and/or user for identifying the network problem.

FIG. 2 is a block diagram of an exemplary site table 200 that summarizes alarms. As shown, site table 200 may include records 202-1 through 202-S (herein collectively referred to as 202 and individually as record 202-x). As further shown, each record 202-x within site table 200 may include site field 204 that identifies a site at which a failure has occurred and a count field 206 that indicates the number of alarms that are generated at the site. Depending on the implementation, record 202-x may include fewer, additional, or different fields than the ones shown in FIG. 2.

Each record 202-x in site table 200 may summarize information about a number of alarms. For example, record 202-1 may indicate that over 318 alarms are generated from a site named PMM. Because site table 200 condenses information that is provided by the alarms, the network operator, manager, or user may examine site table 200 faster and more easily than they would examine alarm records 100.

In addition to summarizing alarms, the outage analysis system may perform a series of actions to determine whether there is an outage and whether the detected outage constitutes a false outage. Furthermore, the outage analysis system may maintain a timeline of events that are associated with outages (e.g., a recovery), and/or provide reports of the events via different notification schemes (e.g., email messages, updating web pages, etc.). The analysis of the outage and/or reports of the outage may be helpful for the network operator, manager, and/or user in identifying and/or resolving network problems that are associated with the outage.

Figure 3:
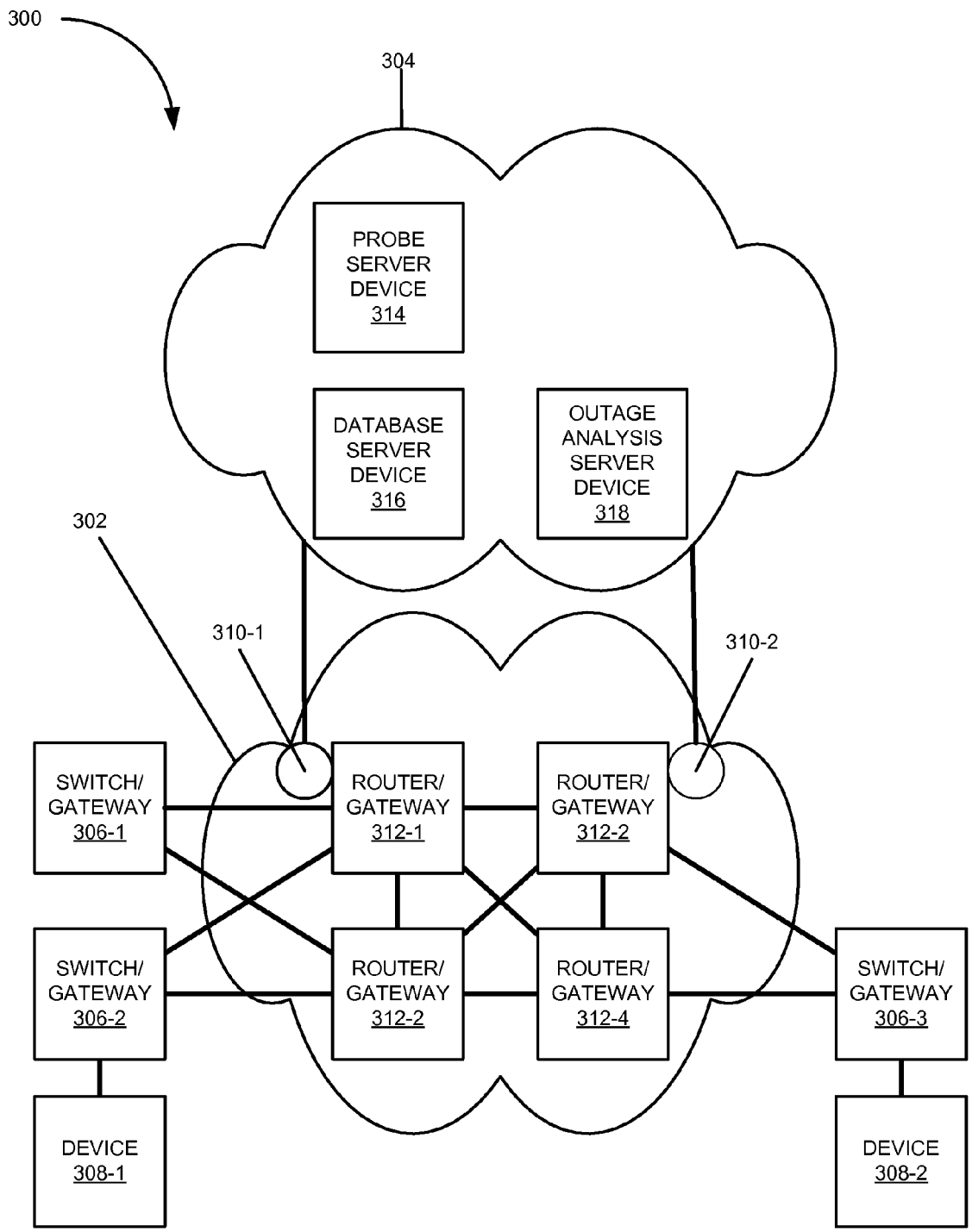
FIG. 3 is a block diagram of an exemplary network in which concepts described herein may be implemented.

FIG. 3 is a block diagram of an exemplary network 300 in which concepts described herein may be implemented. As shown, network 300 may include a service/signaling network 302 (e.g., signaling system 7 (SS7) network, an Internet Protocol (IP) network, etc.) and a control/monitoring network 304 (e.g., SS7 network, IP network, etc.), switch/gateways 306-1 through 306-3 (herein collectively referred to as switches/gateways 306 and individually as switch/gateway 306-x), devices 308-1 and 308-2, and probes 310-1 and 310-2. Depending on the implementation, network 300 may include additional, fewer, or different devices than those illustrated in FIG. 3. For example, network 300 may include additional switches/gateways 306, devices 308, and/or probes 310.

Service/signaling network 302 may include a public switched telephone network (PSTN), a local area network (LAN), a wireless LAN (WLAN), a wide area network (WAN), a metropolitan area network (MAN), a cellular network, the Internet, any other network, or a combination of networks.

Control/monitoring network 304 may include a LAN, a WLAN, a WAN, a MAN, a cellular network, the Internet, a PSTN, any other network, or a combination of networks. Depending on the implementation, control/monitoring network 304 and service/signaling network 302 may be implemented as part of the same network, or two different networks.

Switch/gateway 306-x may include one or more devices that provide signal entry/exit to/from service/signaling network 302. For example, in the context of SS7, switch/gateway 306 may include a service switching point (SSP) that handles incoming telephone calls. In another example, in the IP context, switch/gateway 306 may include a gateway that relays IP packets from a computer.

Devices 308 may include devices that communicate with other devices in service/signaling network 302. For example, if service/signaling network 302 is implemented as a SS7 network, device 308-x may include a telephone. If service/signaling network 302 is implemented as an IP network, device 308-x may include a personal computer, a laptop, etc.

Probes 310-1 and 310-2 may include devices for detecting device/component failures and for generating alarms when probes 310 detect the failures. For example, probe 310-1 may detect a failure on the device/link to which probe 310-1 is attached (e.g., a link between router/gateway 312-1 and another device). When probe 310-1 detects a failure of the device/link, probe 310-1 may generate an alarm. The alarm may be sent to an alarm collecting device (e.g., probe server device 314) in control/monitoring network 304.

As further shown in FIG. 3, service/signaling network 302 may include routers/gateways 312-1 through 312-4 (herein collectively referred to as routers/gateways 312 and individually as router/gateway 312-x). Although service/signaling network 302 is shown as including routers/gateways 312-1 through 312-4, depending on the implementation, service/signaling network 302 may include fewer, additional, or different devices than those illustrated in FIG. 3. For example, when service/signaling network 302 is implemented as a SS7 network, service/signaling network 302 may include voice circuits and/or service control points (SCP) (not shown) for supporting telephony.

Router/gateway 312-x may include a device for routing messages and/or packets between different points in service/signaling network 302 and/or other routers/gateways 312. Depending on the implementation of service/signaling network 302, routers/gateways 312 may include an IP packet router, a switch, a bridge, a signal transfer points (STPs), or any other device that may be used to deliver and/or relay messages or packets.

As further shown in FIG. 3, control/monitoring network 304 may include a probe server device 314, a database server device 316 and an outage analysis server device 318. Depending on the implementation, control/monitoring network 304 may include fewer, additional, or different devices than those illustrated in FIG. 3, such as a central device for collecting information about different network topology. In one implementation, functionalities of database server device 314, probe server device 316, and/or outage analysis server device 318 may be combined in a single device, or alternatively, may be distributed over additional devices.

Probe server device 314 may receive alarms that are generated at probes 310 and may provide the alarms to database server device 316 and/or outage analysis server device 318. Database server device 316 may store and/or dispense information about alarms and/or network devices in one or more databases. For example, database server device 316 may store information about alarms that are received by probe server device 314, and may dispense information about the alarms to outage analysis server device 318. In another example, database server device 316 may store circuit layout records (CLRs) (e.g., a list of devices that form a network circuit) and provide outage analysis server device 318 with the CLRs.

Outage analysis server device 318 may analyze alarm-related information (e.g., CLRs, alarm records, etc.) that is stored in database server device 316, summarize results of the analysis in different formats, and provide reports of the summaries to network operators, managers, etc. In analyzing the alarm-related information that is stored in database server device 316, outage analysis server device 318 may correlate different data, detect outages, detect probe failures, and/or track device restorations after outages. In providing the reports, outage analysis server device 318 may post the reports as web pages, and/or send reports as email messages and/or other types of messages (e.g., instant messages).

Figure 4:
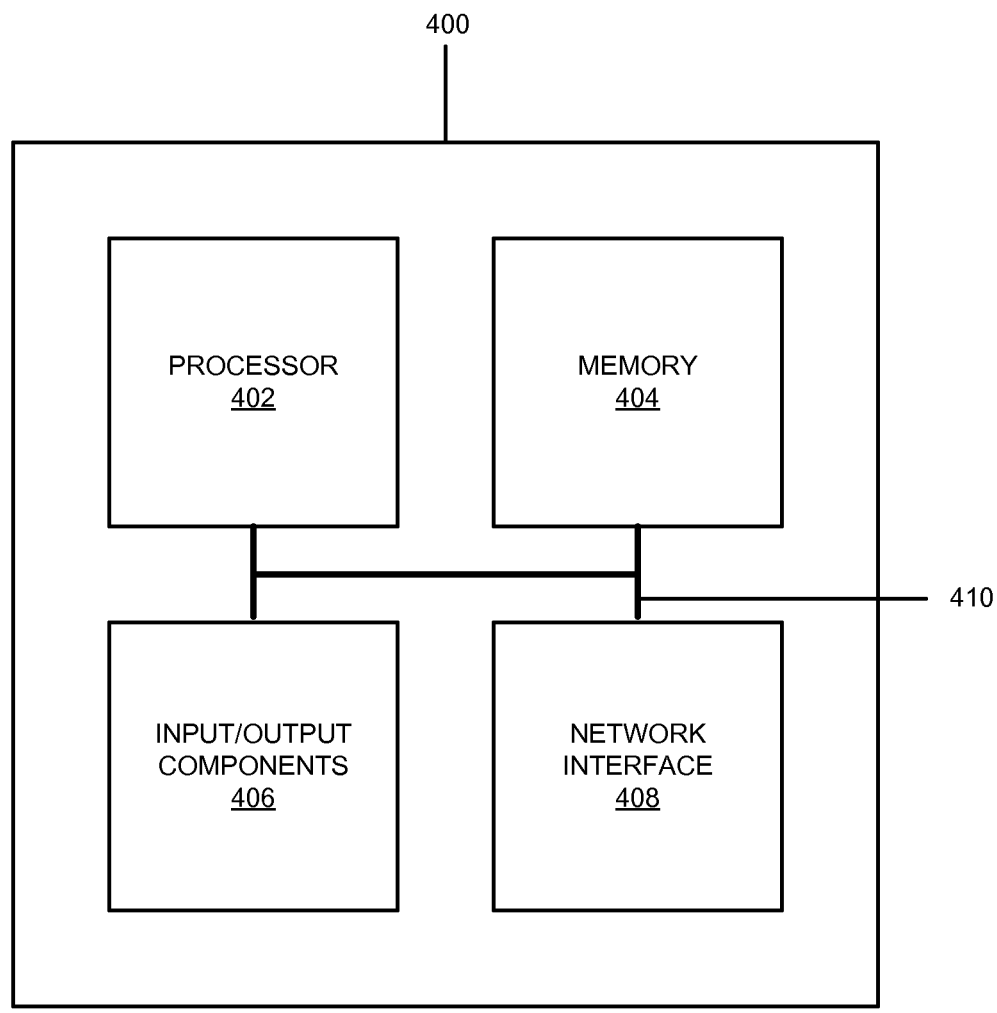
FIG. 4 is a block diagram of exemplary devices of FIG. 3.

FIG. 4 is a block diagram of exemplary devices of FIG. 3. Device 400 may represent one or more of devices in FIG. 3, such as switch/gateway 310-x, router/gateway 312-x, probe server device 314, database server device 316, and/or outage analysis server device 318. As shown, device 400 may include a processor 402, a memory 404, input/output components 406, a network interface 408, and a communication path 410. In different implementations, device 400 may include additional, fewer, or different components than the ones illustrated in FIG. 4. For example, device 400 may include additional line interfaces, such as interfaces for receiving and forwarding messages (e.g., packets, SS7 messages, etc.).

Processor 402 may include a processor, a microprocessor, an Application Specific Integrated Circuit (ASIC), a Field Programmable Gate Array (FPGA), and/or other processing logic capable of controlling device 400. Memory 404 may include static memory, such as read only memory (ROM), and/or dynamic memory, such as random access memory (RAM), or onboard cache, for storing data and machine-readable instructions. Memory 404 may also include storage devices, such as a floppy disk, CD ROM, CD read/write (R/W) disc, and/or flash memory, as well as other types of storage devices.

Input/output components 406 may include a display screen, a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to device 400.

Network interface 408 may include any transceiver-like mechanism that enables device 400 to communicate with other devices and/or systems. For example, network interface 408 may include mechanisms for communicating via a network, such as the Internet, a terrestrial wireless network (e.g., a WLAN), a satellite-based network, a wireless personal area network (WPAN), etc. Additionally or alternatively, network interface 408 may include a modem, an Ethernet interface to a LAN, and/or an interface/connection for connecting device 400 to other devices.

Communication path 410 may provide an interface through which components of network device 400 can communicate with one another.

Figure 5:
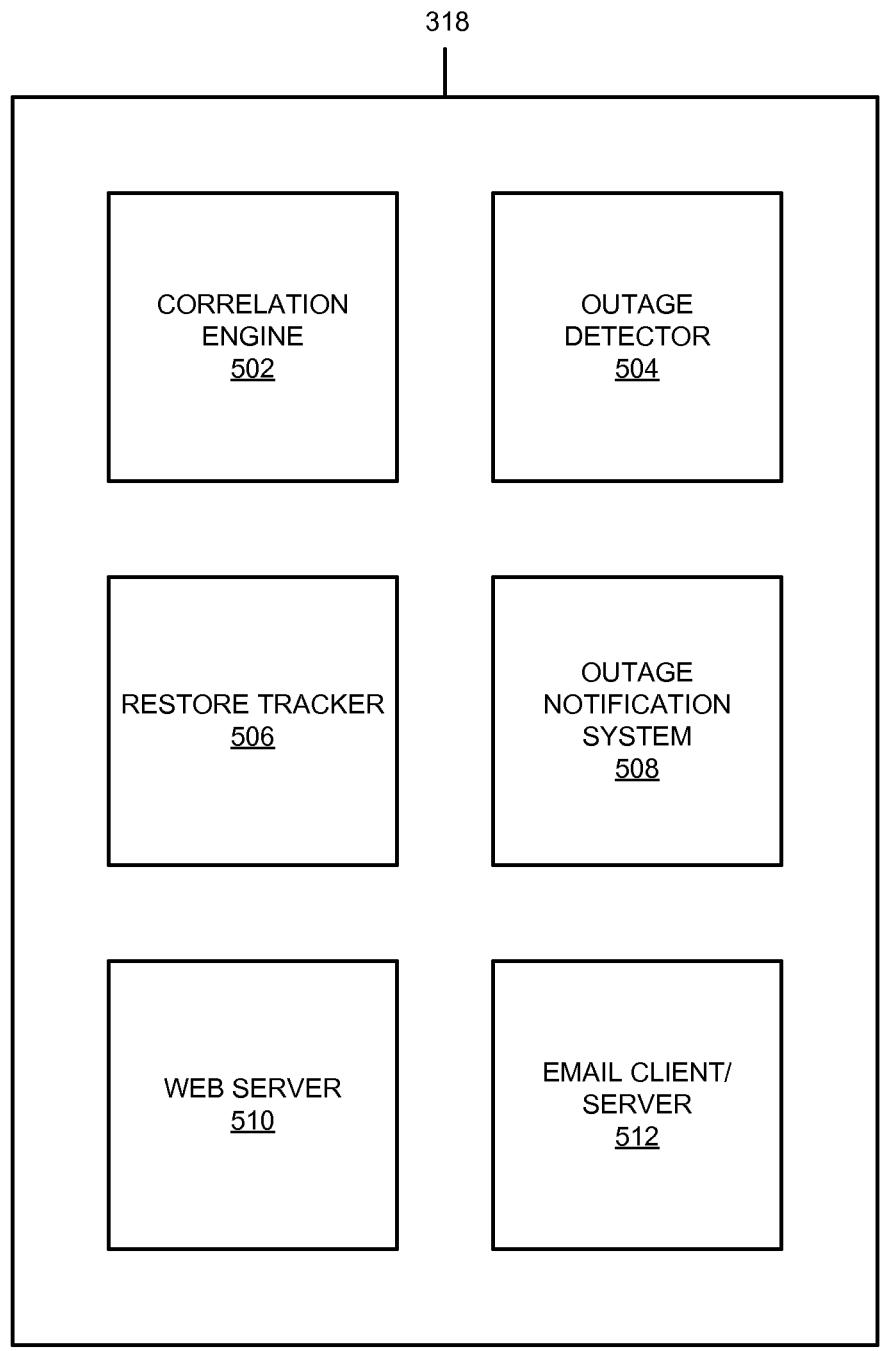
FIG. 5 is a functional block diagram of an exemplary outage analysis server device of FIG. 3.

FIG. 5 is a functional block diagram of exemplary outage analysis server device 318. As shown, outage analysis server device 318 may include a correlation engine 502, an outage detector 504, a restore tracker 506, an outage notification system 508, a web server 510, and email client/server 512. Although not illustrated in FIG. 5, outage analysis server device 318 may include additional functional components, such as the components included in device 400, an operating system (e.g., Linux, Windows, etc.), an application (e.g., an instant messenger client), etc.

Correlation engine 502 may correlate alarm-related information that is stored in database server device 314 and summarize the information. In one implementation, correlation engine 502 may correlate circuit layout records (CLRs) that are stored in database server device 316, and produce summaries of the CLRs as tables.

FIG. 6 shows an exemplary CLR 600 in database server device 316. As shown, CLR 600 may include lines 602-1 thorough 602-N (herein collectively referred to as lines 602 and individually as line 602-x). As further shown, each line 602-x may include a site identifier (ID) field 604 and an equipment specification field 606. Line 602-x may include other fields, although they are not illustrated in FIG. 6. Site ID field 604 may provide the name of a site (e.g., a datacenter) that hosts a particular network element. Equipment specification field 606 may identify a network element (e.g., a cross-connect) and/or provide a description of the network element.

When an outage occurs, correlation engine 502 may scan CLRs that correspond to failed network elements in network 302. Correlation engine 502 may scan each CLR by splitting CLR 600 into lines 602, and partitioning each line 602-x into segments or portions. Furthermore, by parsing each of the segments, correlation engine 502 may count the number of times that each site or each link occurs in lines 602. Correlation engine 502 may tally the number of occurrences for each site and each link in the CLRs and generate tables that summarize results of the tally.

For example, correlation engine 502 may partition each line 602-x into segments, scan the segments, and count the number of occurrences for each of sites AST, MEJ, and WYV (e.g., 3 times for AST, 2 times for MEJ, 3 times for WYV, and once for NOR). Correlation engine 502 may aggregate the results of such counts over many CLRs into a site table that summarizes the information included in the CLRs.

FIG. 7A illustrates an exemplary site table 700. As shown, site table 700 may include records 702-1 through 702-P (hereinafter collectively referred to as records 702 and individually as record 702-x). As further shown, each record 702-x may include a site field 704 that identifies the site at which alarms due to the outage are generated and a count field 706 that indicates the number of alarms that are generated due to device/component failures at the site. For example, according to record 702-1, 318 alarms are generated at site AST.

In scanning the CLRs, in addition to counting the number of occurrences of each site, correlation engine 502 may also count the number of occurrences of each of the failed links. Correlation engine 502 may tally the number of occurrences of each link of a given type (e.g., a Digital Signal Level 1 (DS1) link for carrying 24 DS0 voice channels at 1.544 megabits per second (Mbps), a Digital Signal Level 3 (DS3) link for carrying data at 44.736 Mbps, etc.) in the CLRs and generate a link table that summarizes the results of the tally.

FIG. 7B illustrates an exemplary link table 708 for DS1 links. As shown, link table 708 may include records 710-1 through 710-Q (hereinafter collectively referred to as records 710 and individually as record 710-x). As further shown, each record 710-x may include a site field 712 that identifies the site at which a failed link is located, a DS1 field 714 that identifies the link associated with record 710-x, and a count field 716 that indicates the number of alarms that are generated by the link. For example, according to record 710-1, 9 alarms are generated by link DXC-1/0 AA DS1 773, which is located at site NOR.

FIG. 7C illustrates another exemplary link table 718 for DS3 links. As shown, link table 718 may include records 720-1 through 720-R (hereinafter collectively referred to as records 720 and individually as record 720-x). As further shown, each record 720-x may include a site field 722 that identifies the site at which a failed link is located, a DS3 field 724 that identifies the link associated with record 720-x, and a count field 726 that indicates the number of alarms that are generated by the link. For example, according to record 720-1, 12 alarms are generated by link M13-ZAV.

Returning to FIG. 5, outage detector 504 may use a decision sequence to analyze a potential outage. In one implementation, outage detector 504 may determine if a number of failed links or unavailable bandwidth has reached a threshold (e.g., 25 links) in a given span of time (e.g., 60 seconds). The threshold may be selected such that when the number of failures or the unavailable bandwidth reaches the threshold, outage detector 504 may conclude that an outage has occurred. In one implementation, the threshold may be set to 25 DS0 or links, which is greater than a Trunk (T1) (1.544 Mbps) worth of bandwidth. Setting such a threshold may prevent outage detector 504 from triggering on false outages (e.g., bouncing devices).

When outage detector 504 detects that the number of failed links or unavailable bandwidth has reached the threshold, outage detector 504 may determine whether an outage flag is set. The outage flag, which can be stored in memory 404, may indicate whether there is currently an outage. If the outage flag indicates that there is no outage, outage detector 504 may pause for a particular amount of time. By pausing, outage detector 504 may allow all pending alarms to be received and detected by outage detector 504. When outage detector 504 resumes, outage detector 504 may reevaluate whether there is an outage based on the number of alarms.

In addition to determining the outage, outage detector 504 may perform a feed-based alarm analysis, to help the network operator, manager, or user determine whether the detected outage is a false outage. In some instances, an alarm-feed (e.g., a system that feeds alarms, probe 310-1, probe 310-2, etc.) may fail. These types of failures can sometimes generate false alarms, and, consequently, cause outage detector 504 to signal a false outage. To determine if the detected outage can be a false outage, outage detector 504 may examine specific types of alarms—alarms that indicate if the probe's alarm feed has failed.

Figure 8:
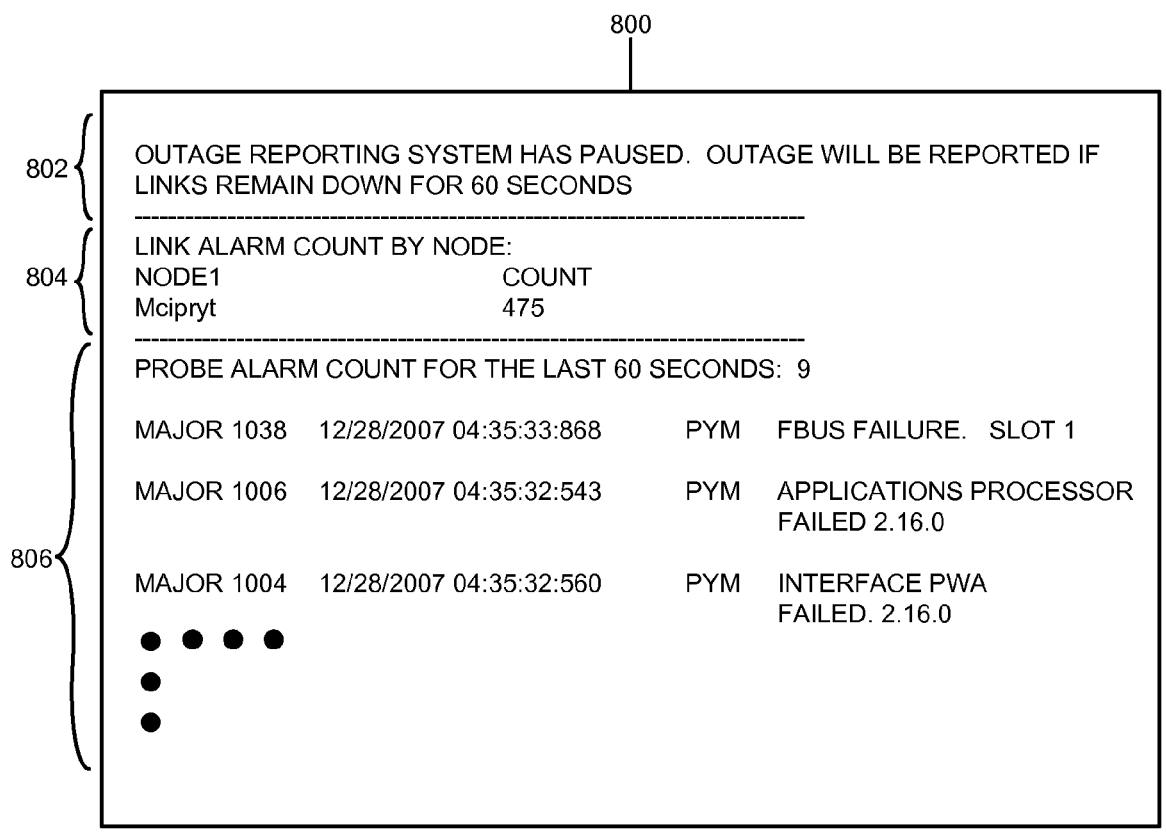
FIG. 8 is an exemplary report of a feed-based analysis.

FIG. 8 is an exemplary report 800 of the feed-based alarm analysis. As shown, report 800 may include a system status portion 802, a summary of alarms portion 804, and a summary of alarm-feed alarms portion 806. Depending on the implementation, report 800 may include additional, fewer, or different portions. Status portion 802 may indicate the current operational status of correlation engine 502, outage detector 504, restore tracker 506, and/or outage notification system 508. Summary of alarms portion 804 may indicate a number of alarms that are generated due to link failures at particular nodes. Summary of alarm-feed alarms portion 806 may list alarms that are generated for a particular alarm-feed. For example, in FIG. 8, summary of alarm-feed alarms portion 806 may indicate that nine alarms have been generated due to alarm-feed failures.

Figure 9A:
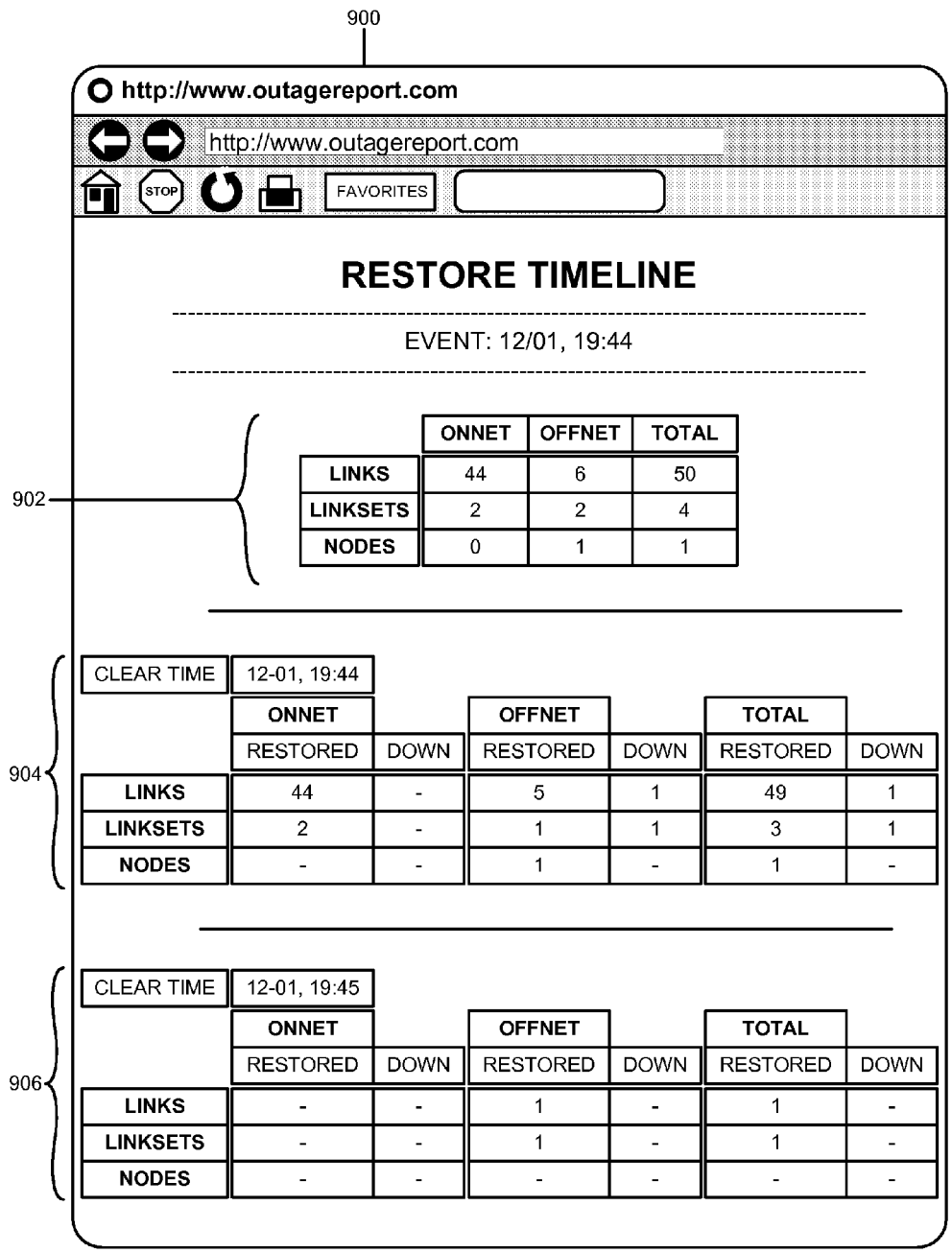
FIG. 9A depicts output of a restore tracker of FIG. 5 as a web page.

Returning to FIG. 5, restore tracker 506 may maintain and provide a timeline for links that are restored after an outage. FIG. 9A shows output of restore tracker 506 as a web page. The web page may be generated upon an occurrence of an event (e.g., an outage, a restore, etc.). As shown, a restore timeline 900 may include a link summary table 902 and restore tables 904 and 906. Depending on the implementation, restore timeline 900 may include additional, fewer, or different components than those illustrated in FIG. 9A.

Figure 9B:
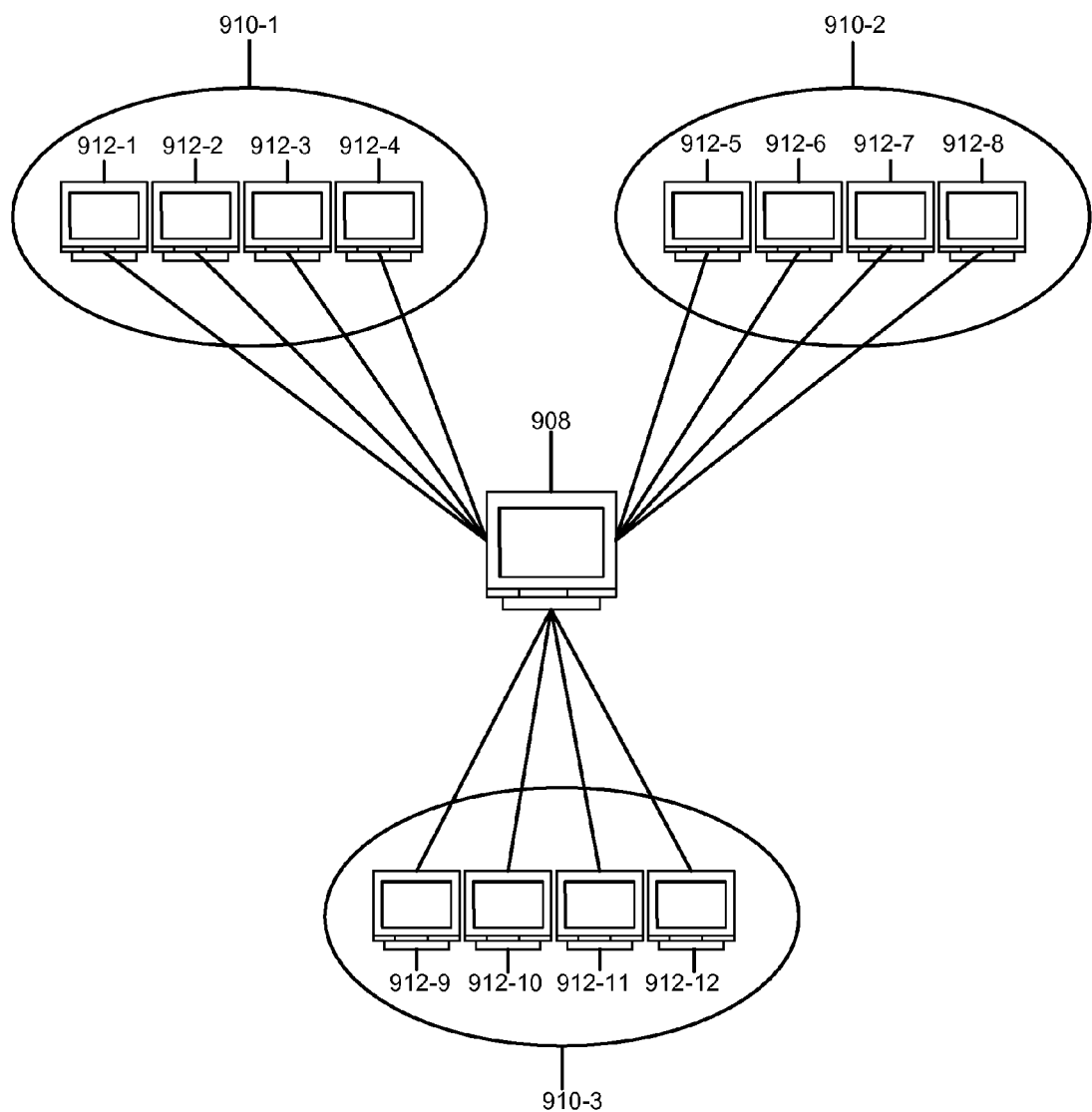
FIG. 9B is a diagram that shows a relationship between an exemplary node, linksets, and links.

Link summary table 902 may provide numbers of links, linksets, and/or nodes that are on-net (e.g., on or in an internal or a designated network) or off-net (e.g., outside of the internal/designated network). FIG. 9B is a diagram that illustrates a relationship between a node 908, linksets 910-1 through 910-3, and links 912-1 through 912-12. As shown, node 908 may represent the highest level of control (e.g., a STP, a switch, etc.). Each of linksets 910-1 through 910-3 may include a collection of links that are connected to node 908. Although FIG. 1 shows three linksets 910-1 through 910-3 and 12 links 912-1 through 912-12, an actual node may be interconnected by fewer or more than 3 linksets and/or 12 links. In addition, the number of links in different linksets may or may not be the same.

Each of restore tables 904 and 906 may include a snap shot of the summary of states of links, linksets, and/or nodes. Furthermore, each of restore tables 904 and 906 may include numbers of link, linksets, and/or nodes that are restored and/or are down. Additionally, restore tables 904 and 906 may also indicate when events (e.g., an occurrence of an outage, etc.) may have been cleared (e.g., an outage no longer exists). Restore tables 904 and 906 may be stored in database server device 316 and retrieved upon demand via, for example, web server 510.

Returning to FIG. 5, outage notification system 508 may provide email reports that are related to outages to the network operators, managers, users, etc. and/or update the databases for web page updates. In providing notifications of events, outage notification system 508 may receive information about different events from other components of FIG. 5, such as correlation engine 502, outage detector 504, etc. In addition, depending on the implementation, outage notification system 508 may provide other types of notifications, including an instant message, a voice mail, etc.

Figure 10A:
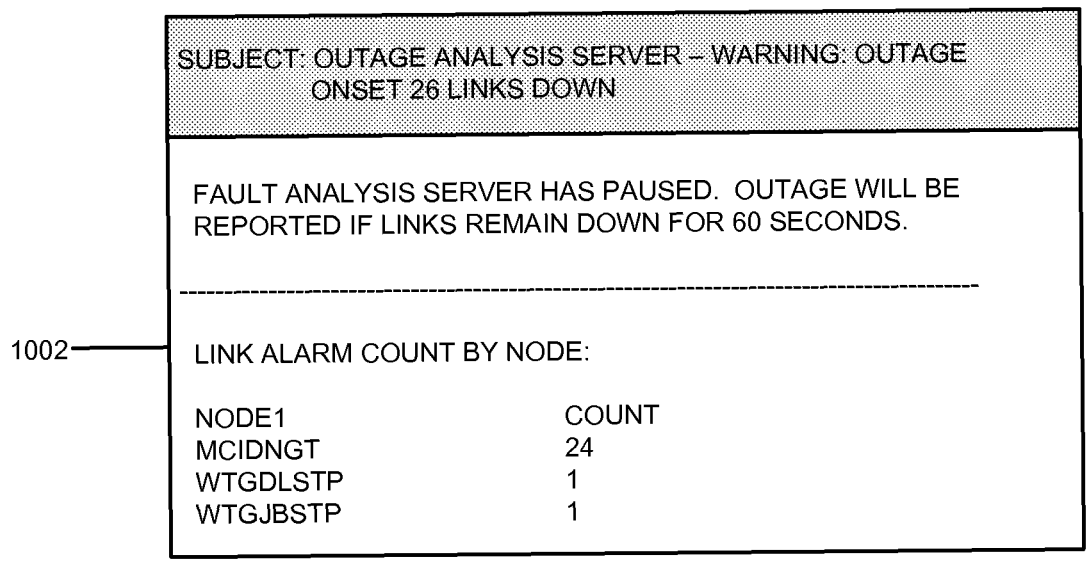
FIGS. 10A through 10D show portions of exemplary email reports about different types of events that are associated with device outages.
Figure 10B:
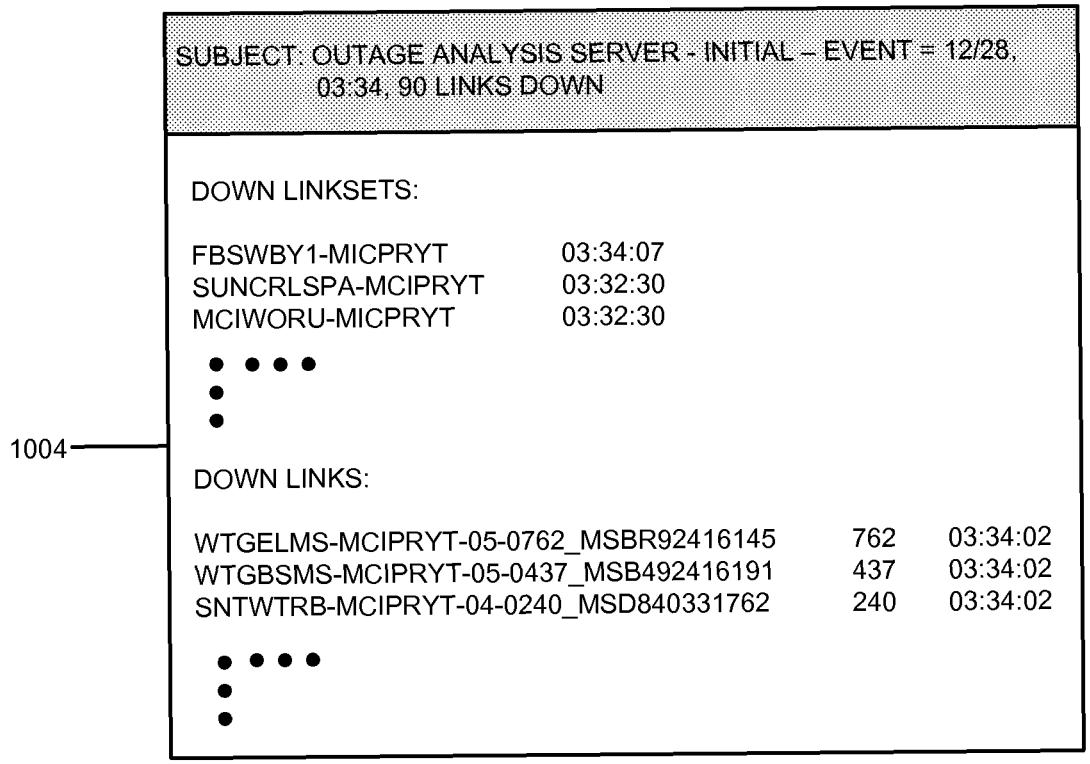
Figure 10C:
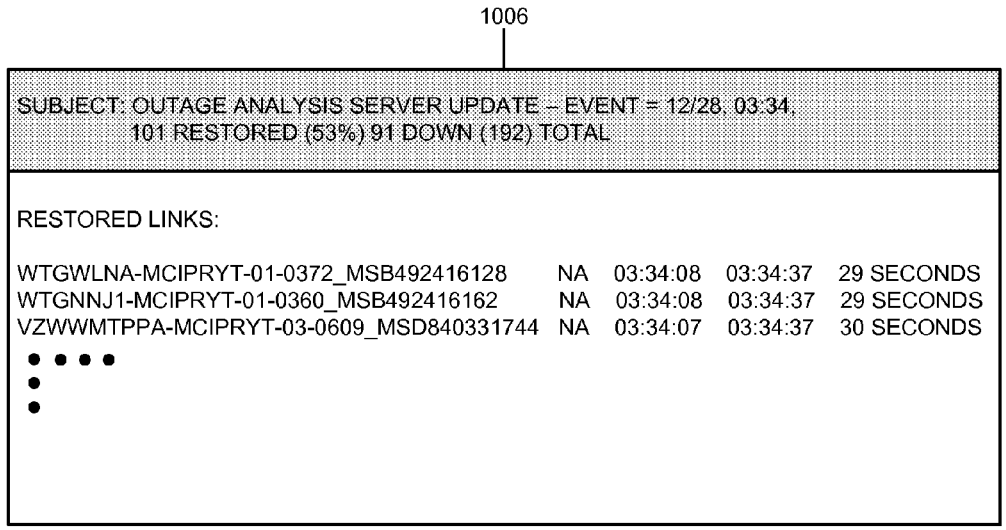
Figure 10D:
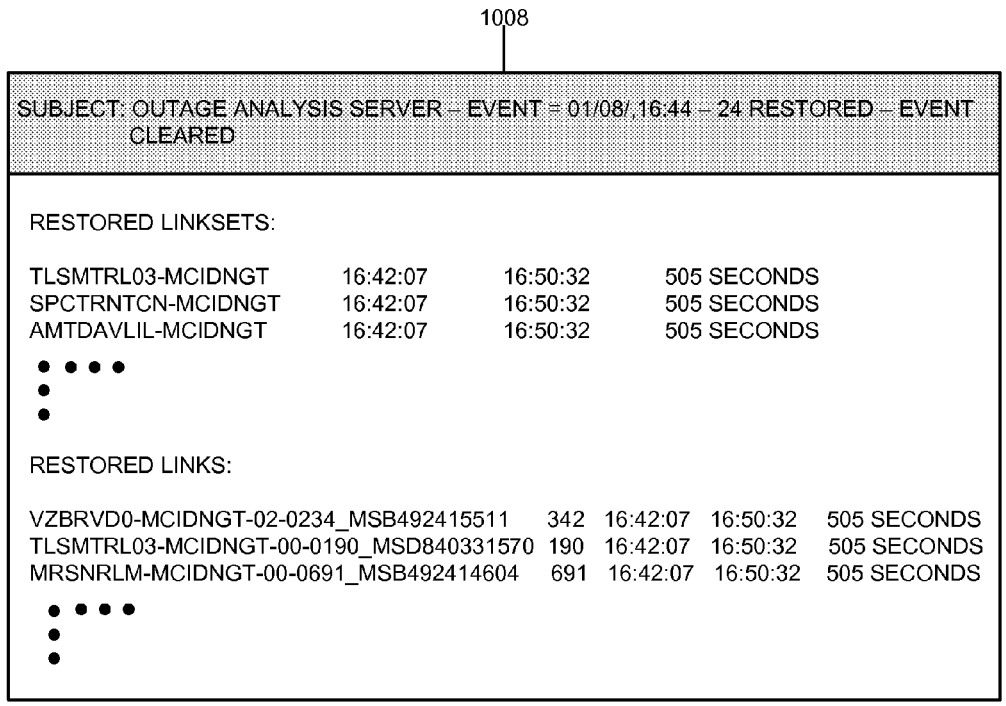

FIG. 10A shows a portion of email report 1002 that may be provided by outage notification system 508. As shown, email report 1002 may indicate an onset of an outage. Email report 1002 may provide information that is related to the outage, such as number of alarms that are generated at different nodes. FIG. 10B shows a portion of another email report 1004. As shown, email report 1004 may provide information that pertains to initial stages of the outage, such as links that are down, times at which the links went down, linksets or nodes that are down, etc. FIG. 10C shows a portion of yet another email report 1006 that may provide an update for an existing event. As shown, email report 1006 may indicate when the links are restored. FIG. 10D shows a portion of still another email report 1008 that may indicate when an event has been cleared. As shown, email report 1008 may include a list of restored linksets, an amount of time that has elapseded before alarms for each linkset has been cleared, a list of links, etc.

Figure 11:
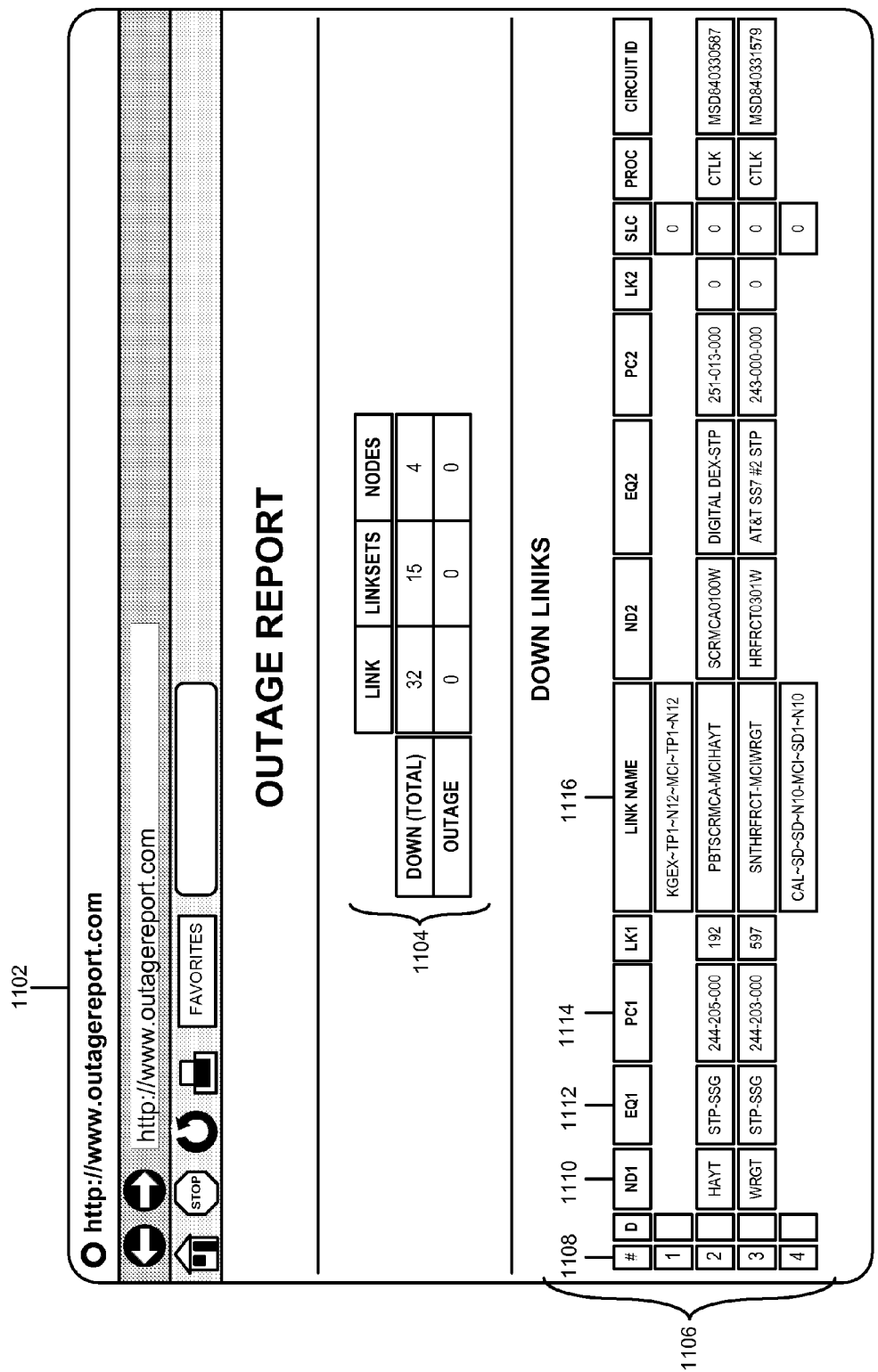
FIG. 11 shows an exemplary web page that describes an outage.

FIG. 11 shows a web page report 1102 that may be provided by outage notification system 508. As shown, web page report 1102 may include a summary table 1104 and a detailed link table 1106. Summary table 1104 may provide a summary of links, linksets, and/or nodes that are down and/or are suffering from an outage. Detailed link table 1106 may include detailed information about links that are down. As shown in FIG. 11, some of the fields of detailed link table 1106 may include an index field 1108 that references a link by an index; a node field 1110 that provides the name of a site at one end of a link; an equipment field 1112 that identifies an equipment at the one end of the link; a point code field 1114 that carries a SS7 code for designating a logical network location of the equipment (e.g., network address); a link name field 1116 for identifying the link; etc.

Although not illustrated in FIG. 11, web page report 1102 may include other types of information, such as outage updates, clearing of an outage, etc. A view of web page report 1102 may be customizable for those who have access to web page report 11102.

Referring back to FIG. 5, web server 510 may include an application for receiving hypertext transfer protocol (HTTP) requests and/or for providing HTTP responses to clients (e.g., browsers). In one implementation, web server 510 may provide static and/or dynamic web pages, programs, etc., in accordance with the output of outage notification system 508. For instance, web server 510 may provide web page report 1102 (FIG. 11) in accordance with outage information from outage notification system 508.

Email client/server 512 may include software components for composing and/or sending email messages in accordance with output of outage notification system 508. For example, email client/server 512 may send email messages whose portions are illustrated in FIGS. 10A through 10D.

Figure 12:
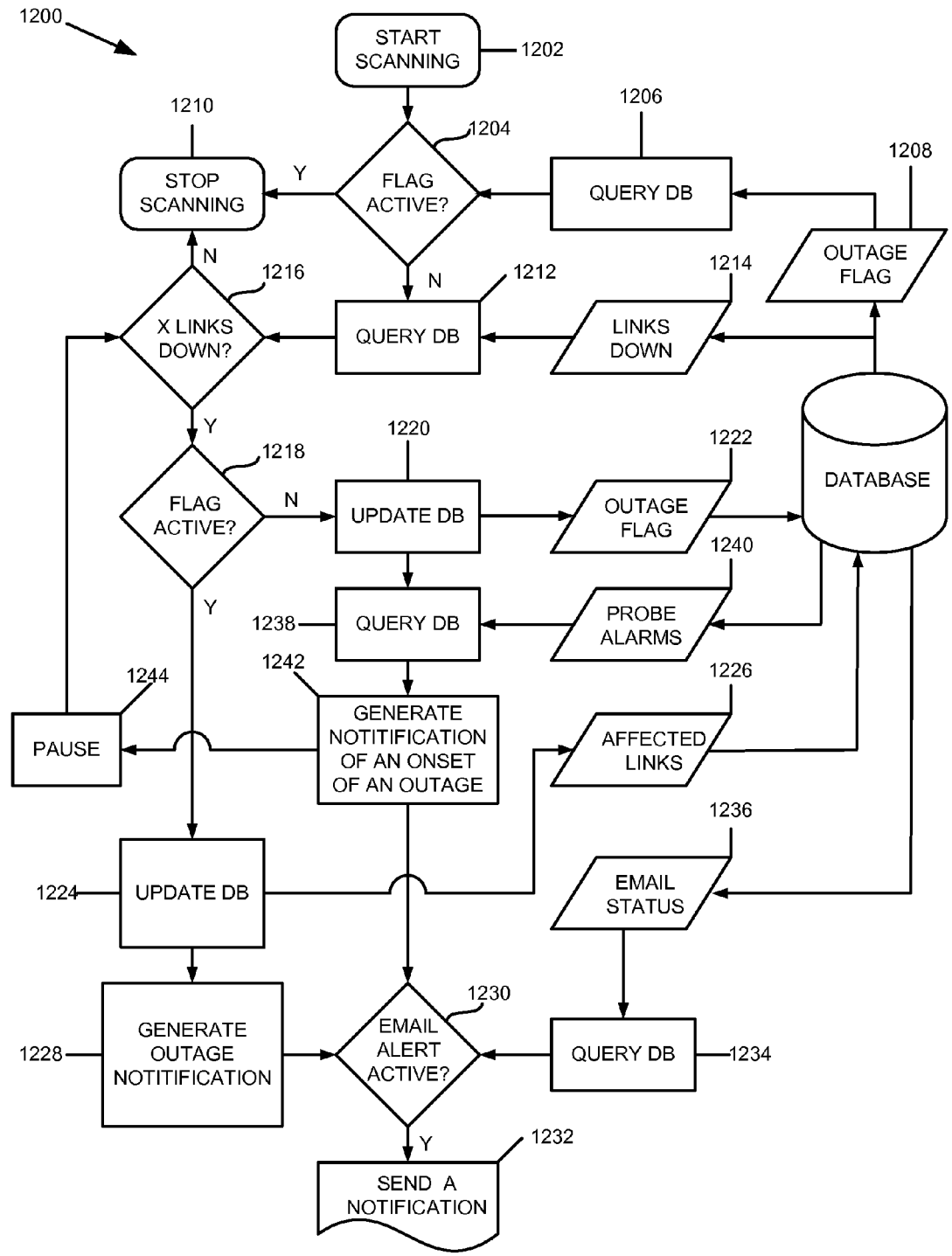
FIG. 12 is a flow diagram of an exemplary process reporting network device outages.

The above paragraphs describe system elements that are related to devices and/or components for analyzing failures/outages of network devices. FIG. 12 is a flow diagram of a process 1200 that is capable of being performed by one or more of these devices and/or components.

As shown in FIG. 12, process 1200 may begin at block 1202, where an outage flag may start being scanned (block 1202). For example, outage analysis server device 318 may begin to scan the outage flag, which may be stored in a database (e.g., a database in database server device 316), to detect whether there is currently an outage.

It may be determined if the outage flag is active (block 1204). To determine whether the outage flag is active, outage analysis server device 318 may query the database, which may respond with the outage flag (blocks 1206 and 1208).

At block 1204, if the outage flag is active, the outage flag may indicate that there is an outage, and process 1200 may proceed to block 1210, where the outage flag may stop being scanned (block 1210). If the outage flag is inactive, process 1200 may proceed to block 1212.

One or more databases may be queried for links that are down (blocks 1212 and 1214). For example, outage analysis server device 318 may query the databases. Based on the query, at block 1216, it may be determined if more than X (e.g., a threshold number, such as 25) links are down (block 1216). If more than X links are not down, process 1200 may proceed to block 1210 and stop scanning the outage flag.

If more than X links are down, it may be determined if the outage flag is active (block 1218). If the outage flag is not active, the outage flag in the database may be updated (blocks 1220 and 1222). If the outage flag is active, the database may be updated so that the alarm records that are associated with the affected links are marked (blocks 1224 and 1226).

At block 1228, a notification of an outage may be generated (block 1228). In one implementation, when outage analysis server device 318 generates the notification, outage analysis server device 318 may update relevant information in the database, such that when web server 510 is accessed via a browser, a web page that shows the outage status may be displayed on the browser.

If an email alert is active (e.g., information in the database indicates outage notification system 508 is to send email messages when an event associated with the outage occurs) (block 1230), a notification about the outage in the form of an email message may be sent (block 1232). In determining whether the email alert is active at block 1230, the database may be queried at block 1234, and email status may be fetched (e.g., whether an email message has been sent) (block 1236).

Returning to block 1220, after updating the database, the database may be queried to obtain alarms that may be related to probe failures (block 1238). In response, alarms that indicate whether probes 310 have failed may be provided (block 1240).

A notification of an onset of the outage may be generated (block 1242). As discussed previously with reference to FIG. 8, the probe alarms (e.g., alarm-feed alarms) may be used to identify or suggest a false positive outage.

Process 1200 may proceed to block 1244, where process 1200 may pause for a particular amount of time (e.g., 1 minute) to allow pending alarms that are associated with the outage to arrive (block 1244). After the pause, process 1200 may proceed to block 1216.

In addition, process 1200 may proceed to block 1230 to determine if the email alert is active. If the email alert is active, a notification (e.g., an onset notification) about the outage may be sent in the form of an email message (block 1232).

In process 1200, depending on the implementation, outage analysis server device 318 may perform correlations of CLRs at different blocks. For example, in one implementation, outage analysis server device 318 may perform a correlation analysis to produce summaries (e.g., site table 700, link table 708, link table 718, etc.) of alarms at block 1228, so that the summaries may be sent with the email messages at block 1232.

Figure 13:
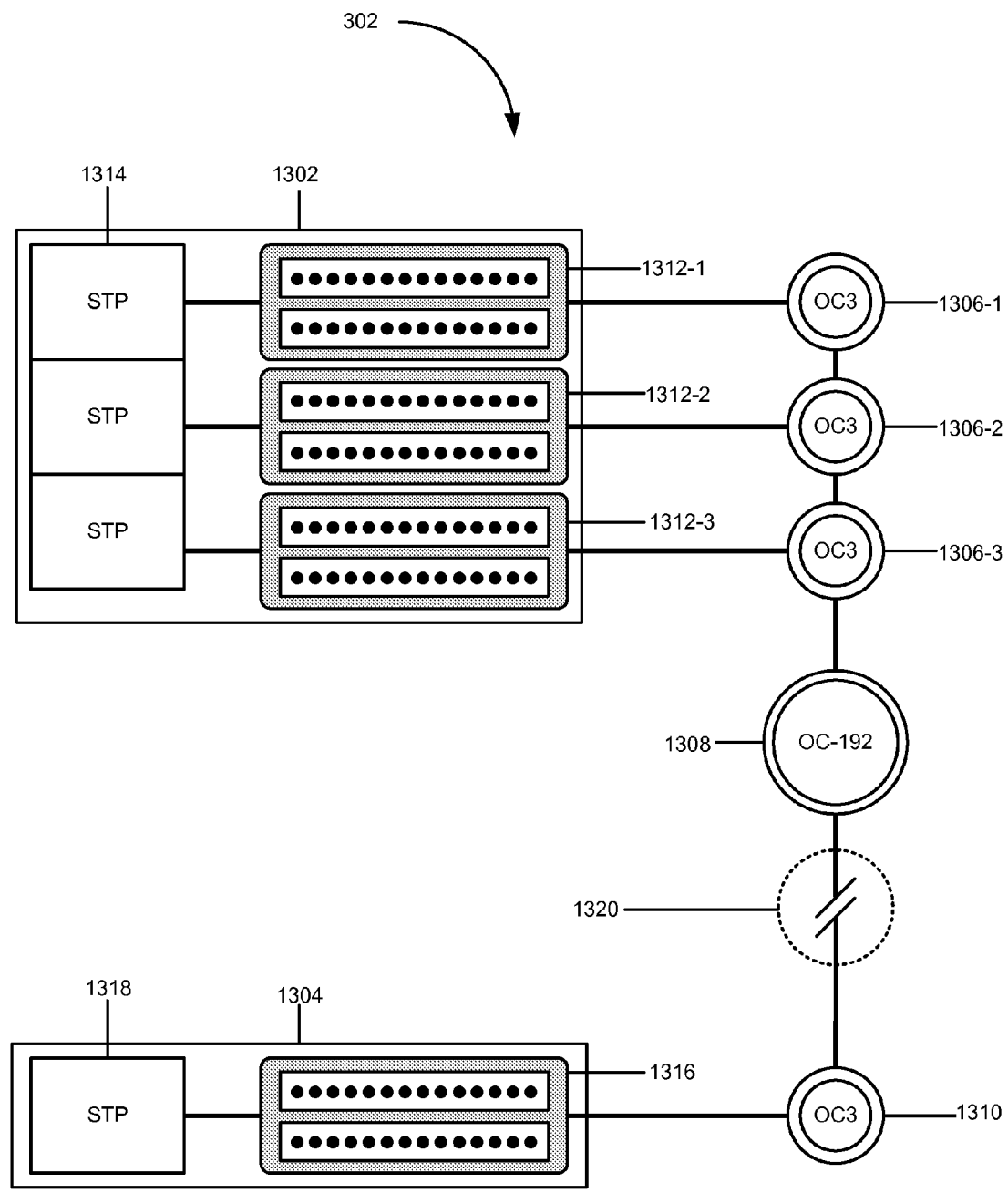
FIG. 13 shows another exemplary network in which the concepts described herein may be implemented.

The following example, with reference to FIGS. 13, 14A and 14B, illustrates a process for analyzing an outage. The example is consistent with exemplary process 1200 described above with reference to FIG. 12.

For the example, assume that service/signaling network 302 includes a site 1302, a site 1304, an optical carrier level 3 (OC-3) 1306-1, an OC-3 1306-2, an OC-3 1306-3, OC-192 1308, and OC-3 1310 that are interconnected as illustrated in FIG. 13. In addition, assume that probes are located at various points in service/signaling network 302, that the threshold for detecting an outage is 25 DS0 links or a bandwidth equivalent of 25 DS0 links. Further, assume that a network engineer trips over a fiber optics line at point 1320 and causes the fiber optics line to become disconnected from OC-3 1308 and OC-3 1310.

In the example, outage analysis server device 318 begins scanning for an outage flag that is stored in a database at database server device 316. The flag is inactive, and outage analysis server device 318 queries the database for a list of alarm records for links that are down. The database shows that more than 25 DS0 links worth of bandwidth is unavailable due to device failures.

Based on the list of alarm records, outage analysis server device 318 obtains CLRs that are associated with the failed links and performs a correlation analysis. Outage analysis server device 318 produces a site table and a link table. FIG. 14A shows the site table 1402. As shown, site HAY generates 5 alarms and site DNJ generates 3 alarms. FIG. 14B shows a link table for DS3 links. As shown, link DNX-88 AA at site HAY generates 5 alarms and each of links M13 ZHE, M13 ZCR, and M13 ZGD generates 1 alarm. Because there are no DS1 links at HAY or DNJ, outage analysis server device 318 does not generate a link table for DS1 links.

Outage analysis server device 318 examines the outage flag again, and updates the database to indicate that the outage flag is active. Furthermore, once outage analysis server device 318 determines that there is a potential outage based the amount of unavailable bandwidth, outage analysis server device 318 determines if a probe has failed, by requesting a list of alarm-feed alarms for the probes.

Outage analysis server device 318 receives no alarm-feed alarms for the probes, and generates a notification of an onset of an outage. Because an email alert is active, the notification is sent to a network operator as an email message. The email message may include results of the correlation analysis, site table 1402, and link table 1404.

In addition, outage analysis server device 318 pauses, in order for other pending alarms that are associated with the detected outage to be collected at database server device 316. Meanwhile, the network engineer who has tripped over the fiber optics cable notices the unplugged fiber optics cable, reconnects the disconnected fiber optics cable, and causes devices in service/signaling network 302 to be restored. Outage analysis server device 318 stops scanning the outage flag when outage analysis server device 318 determines that there are less than 25 DS0 inks worth of bandwidth that is unavailable.

Outage analysis server device 318 prepares additional email alerts (e.g., an update report, etc.) and sends them to the network operator. In addition, outage analysis server device 318 updates the database so that when a user accesses web server 510 via a remote browser, web server 510 may provide other notifications (e.g., table 1106) and/or a timeline of outage restores (e.g., restore table 904).

In the above example, outage analysis server 318 receives alarms about network device failures/outages, summarizes and/or analyzes the alarms, and provides a report of the summary and/or analysis to the network operator. In a system that is much larger than that illustrated in FIG. 13, when an outage occurs, many network devices (e.g., tens of thousands) may fail, and flood the outage analysis system with alarms that are translated to alarm records. In such instances, because the number of alarm records is large, attempting to diagnose a network problem by manually examining the alarm records may be difficult or impractical. In such a case, a summary of information about the alarms may be helpful to the network operator for identifying the network problem.

In addition to summarizing the alarms, outage analysis server device 318 may perform a series of actions to determine whether there is an outage and whether the detected outage is a false outage. Outage analysis server device 318 may also maintain a timeline of events that are associated with the outage, and/or provide reports of the outage via different notification schemes (e.g., email messages, updating web pages, etc.). The analysis and/or reports of the outage may be helpful for the network operator, manager, and/or user in identifying and/or resolving network problems that are associated with the outage.

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 12, the order of the blocks may be modified in other implementations. In addition, non-dependent blocks may be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   receiving, over a network including a plurality of sites, a plurality of alarms identifying alarm-related information associated with failures of network elements and failures of links between the network elements associated with one or more of the sites;
   creating, from the alarm-related information, a first table including:
      a list of different types of the links with which the alarms are associated wherein the different types correspond to multiple Digital Signal Levels,
      an aggregated number of the plurality of alarms associated with each of the different type of the listed links,
      a list of the sites with which the alarms are associated, and
      an aggregated number of the plurality of alarms associated with each of the listed sites;
   determining that a potential outage has occurred based on an analysis of at least a portion of the alarm-related information with respect to a threshold value for an unavailable link equivalent corresponding to a particular amount of bandwidth, wherein the at least a portion of the alarm-related information includes at least one of:
      an amount of unavailable bandwidth per unit time, or
      a number of unavailable links per unit time;
   analyzing whether the potential outage is a false outage by determining that a probe, used to generate at least one of the plurality of alarms, has failed based on the at least one of the plurality of alarms indicating a failure of the probe; and
   providing a notification including:
      the first table, and
      an indication of whether the potential outage corresponds to an outage that has occurred or the potential outage is a false outage.

2. The method of claim 1, further comprising:
   creating a second table that includes a list of two or more different types of the links at which the plurality of alarms are generated and an aggregated number of the plurality of alarms for each of the two or more different types of the links.

3. The method of claim 1, wherein the links correspond to multiple types of links and creating the first table includes:
   dividing a circuit layout record into lines, wherein the circuit layout record corresponds to a list of devices that form a circuit in the network;
   partitioning each of the lines into segments; and
   parsing each of the segments to identify an aggregated occurrence, of the one or more of the sites within the segment, corresponding to the multiple types of links.

4. The method of claim 2, wherein creating the second table includes:
   counting a number of occurrences of each of the two or more different types of the links.

5. The method of claim 1, wherein determining that the potential outage has occurred includes:
   updating a flag in a database to indicate that the potential outage has occurred when the amount of unavailable bandwidth has reached the threshold in a particular time interval.

6. The method of claim 1, further comprising:
   waiting for a particular amount of time after determining that the outage has occurred for additional alarms to be received.

7. The method of claim 1, wherein providing the notification includes at least one of:
   updating a database that supplies information for generating a web page that displays an outage status; or
   sending an email message about a status of the outage that has occurred.

8. The method of claim 7, wherein sending the email message includes one of:
   sending an email message about an onset of the outage that has occurred; or
   sending an email message about restoration of the network elements after the outage has occurred.

9. The method of claim 1, wherein providing the notification includes:
   providing a web page that shows a timeline of events that are associated with the outage that has occurred.

10. A device comprising:
    a processor to:
       receive, over a network including a plurality of sites, a plurality of alarms that identify alarm-related information associated with failures of network elements and failures of links between the network elements associated with one or more of the sites;
       determine that a potential outage has occurred based on an analysis of at least a portion of the alarm-related information with respect to a threshold value for an unavailable link equivalent corresponding to a particular amount of bandwidth indicated in the at least a portion of the alarm-related information;
       create, from the alarm-related information, a first table including:
          a list of the sites with which the alarms are associated,
          an aggregated number of the plurality of alarms associated with each of the listed sites,
          a list of different types of the links with which the alarms are associated, wherein the different types correspond to multiple Digital Signal Levels, and
          an aggregated number of the plurality of alarms associated with each of the different types of the listed links;
       determine whether the potential outage is a false outage by determining that an alarm-feed, via which at least one of the plurality of alarms was generated, has failed based on the at least one of the plurality of alarms indicating a failure of the alarm feed; and store information regarding whether the potential outage corresponds to an outage that has occurred.

11. The device of claim 10, wherein the network elements include at least one of:
    a digital signal level link;
    an optical carrier level link; or
    a trunk level link.

12. The device of claim 10, wherein the network elements include at least one of:
    a signaling system 7 (SS7) network element; or
    an Internet Protocol (IP) network element.

13. The device of claim 10, where the processor is further configured to:
    correlate information provided in circuit layout records to produce a second table that summarizes the alarm-related information.

14. The device of claim 13, where the second table includes:
    a list of the sites at which the plurality of alarms are generated and a number of the plurality of alarms generated at each of the listed sites.

15. The device of claim 10, wherein the processor is further configured to:
    send an email message about the outage that has occurred.

16. The device of claim 15, where the email message includes:
    information about an onset of the outage that has occurred; or
    information about restoration of one of the network elements after the outage that has occurred.

17. The device of claim 10, where the processor is further configured to:
    receive a browser request for an operational status of the network elements; and
    respond with information about the operational status of the network elements when the processor receives browser requests for information about the outage that has occurred.

18. A non-transitory computer-readable medium comprising computer-executable instructions, the computer-executable instructions comprising:
    instructions for querying a database for a plurality of alarms that are carried over a network and indicate alarm-related information associated with failures of network elements and failures of different types of links between the network wherein the different types correspond to multiple Digital Signal Levels elements associated with one or more of sites in the network wherein the different types correspond to multiple Digital Signal Levels;
    instructions for summarizing the alarm-related information and correlating information, provided in circuit layout records, to produce tables aggregating the plurality of alarms associated with each of the different types of the links and aggregating the plurality of alarms associated with each of the one or more sites;
    instructions for determining that a potential outage has occurred based on an analysis of at least a portion of the alarm-related information with respect to a threshold value for an unavailable link equivalent, wherein the at least a portion of the alarm-related information includes an amount of unavailable bandwidth that is equivalent to a particular number of unavailable links;
    instructions for determining whether the potential outage is a false outage based on a response, from the database to the query for the plurality of alarms, the response including, when a probe that has generated a number of the plurality of alarms has failed, a first alarm that indicates a failure of the probe; and
    instructions for updating a status of an outage, that has occurred, in the database and for sending email reports that include the tables.

* * * * *